United States Patent
Tsirkin et al.

(10) Patent No.: US 9,454,394 B2
(45) Date of Patent: Sep. 27, 2016

(54) HYPERVISOR DYNAMICALLY ASSIGNED INPUT/OUTPUT RESOURCES FOR VIRTUAL DEVICES

(71) Applicant: Red Hat Israel, Ltd., Ra'anana (IL)

(72) Inventors: Michael Tsirkin, Ra'anana (IL); Gleb Natapov, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 188 days.

(21) Appl. No.: 14/088,186

(22) Filed: Nov. 22, 2013

(65) Prior Publication Data

US 2015/0149996 A1    May 28, 2015

(51) Int. Cl.
*G06F 9/50* (2006.01)
*G06F 9/455* (2006.01)

(52) U.S. Cl.
CPC ......... *G06F 9/45558* (2013.01); *G06F 9/5077* (2013.01); *G06F 2009/45579* (2013.01); *G06F 2209/507* (2013.01)

(58) Field of Classification Search
CPC .................................................. G06F 9/5077
USPC ............................................................. 718/1
See application file for complete search history.

(56) References Cited

U.S. PATENT DOCUMENTS

| | | | |
|---|---|---|---|
| 7,739,415 B2 * | 6/2010 | Banzhaf et al. | 709/250 |
| 7,743,389 B2 * | 6/2010 | Mahalingam et al. | 719/321 |
| 8,141,092 B2 | 3/2012 | Brown et al. | |
| 8,151,265 B2 | 4/2012 | Yehuda et al. | |
| 8,225,005 B2 | 7/2012 | Freimuth et al. | |
| 8,346,997 B2 | 1/2013 | Freimuth et al. | |
| 2006/0034167 A1 | 2/2006 | Grice et al. | |
| 2009/0164990 A1 * | 6/2009 | Ben-Yehuda et al. | 718/1 |
| 2013/0229421 A1 * | 9/2013 | Cheng et al. | 345/522 |
| 2014/0201417 A1 * | 7/2014 | Dalal | H04L 47/193 710/308 |
| 2015/0026379 A1 * | 1/2015 | Yang et al. | 710/305 |

OTHER PUBLICATIONS

PCI Hot-Plug Specification, 2001.*
William Favorite, PowerVM QuickStart; retrieved on Nov. 11, 2013 from http://www.tablespace.net/quicksheet/powervm-quickstart.html dated Mar. 11, 2012, pp. 1-14.
XenServer Administrator's Guide: Release 5.0.0; Published Sep. 2008, 1.0 Edition; retrieved Nov. 11, 2013 from http://support.citrix.com/servlet/KbServlet/download/18051-102-19048/reference.pdf; Copyright 2008 Citrix Systems, Inc.; pp. 1-128 pages numbered— (133 pages total).
NextIO's vNET I/O Maestro Simplifies Complex Server I/O; retrieved on Nov. 11, 2013 from https://web.archive.org/web/20120516041429/http://www.nextio.com/products/vnet; 2 pages.

* cited by examiner

*Primary Examiner* — Emerson Puente
*Assistant Examiner* — Charlie Sun
(74) *Attorney, Agent, or Firm* — Haynes and Boone, LLP

(57) ABSTRACT

Systems and methods are disclosed for assigning an I/O resource to a virtual PCI device. An example system includes an I/O resource table that stores a pool of one or more available I/O resources for assignment to one or more virtual PCI devices. The system also includes a hypervisor that maintains the pool of I/O resources, assigns one or more I/O resources from the pool to a virtual PCI device, and notifies a guest running on a virtual machine that the one or more I/O resources is assigned to the virtual PCI device. The hypervisor and virtual machine are executable on a host, and the virtual PCI device is exposed to the guest.

20 Claims, 4 Drawing Sheets

HYPERVISOR DYNAMICALLY ASSIGNED INPUT/OUTPUT RESOURCES FOR VIRTUAL DEVICES

BACKGROUND

The present disclosure generally relates to virtualization systems, and more particularly to assigning resources to devices in a virtual environment.

A virtual machine is a portion of software that, when executed on appropriate hardware, creates an environment allowing the virtualization of an actual physical computer system. Each virtual machine may function as a self-contained platform, running its own operating system (OS) and software applications (processes).

A host machine is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

A virtual device may be exposed to a guest as part of the virtual machine. The virtual device is controlled by reading from and writing to its registers, which are mapped to Input/Output (I/O) resources (e.g., I/O ports and I/O memory). The use of I/O resources is device and architecture dependent. For example, on the i386, most Industry Standard Architecture (ISA) devices map their registers to I/O resources; however, Peripheral Component Interconnect (PCI) devices tend to map their registers to I/O memory. To initialize the device, the guest may assign an address space to the device. The address space may be either memory or I/O resource space or both.

BRIEF SUMMARY

This disclosure relates to dynamically assigning resources to a virtual device. Methods, systems, and techniques to assign one or more I/O resources to one or more virtual PCI devices are provided.

According to an embodiment, a method of assigning one or more I/O resources to one or more virtual PCI devices includes maintaining, via a hypervisor executable on a host, a pool of I/O resources for assignment to one or more virtual PCI devices. The method also includes assigning, via the hypervisor, one or more I/O resources from the pool to a virtual PCI device. The method further includes notifying a guest running on a virtual machine that the one or more I/O resources is assigned to the virtual PCI device. The virtual machine is executable on the host, and the virtual PCI device is exposed to the guest as part of the virtual machine.

According to another embodiment, a system for assigning one or more I/O resources to one or more virtual PCI devices includes an I/O resource table including a pool of one or more available I/O resources for assignment to one or more virtual PCI devices. The system also includes a hypervisor that maintains the pool of I/O resources, assigns one or more I/O resources from the pool to a virtual PCI device, and notifies a guest running on a virtual machine that the one or more I/O resources is assigned to the virtual PCI device. The hypervisor and virtual machine are executable on a host, and the virtual PCI device is exposed to the guest.

According to another embodiment, a non-transitory machine-readable medium includes a plurality of machine-readable instructions that when executed by one or more processors are adapted to cause the one or more processors to perform a method including: maintaining, via a hypervisor executable on a host, a pool of I/O resources for assignment to one or more virtual PCI devices; assigning, via the hypervisor, one or more I/O resources from the pool to a virtual PCI device; and notifying a guest running on a virtual machine that the one or more I/O resources is assigned to the virtual PCI device. The virtual machine is executable on the host, and the virtual PCI device is exposed to the guest as part of the virtual machine

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
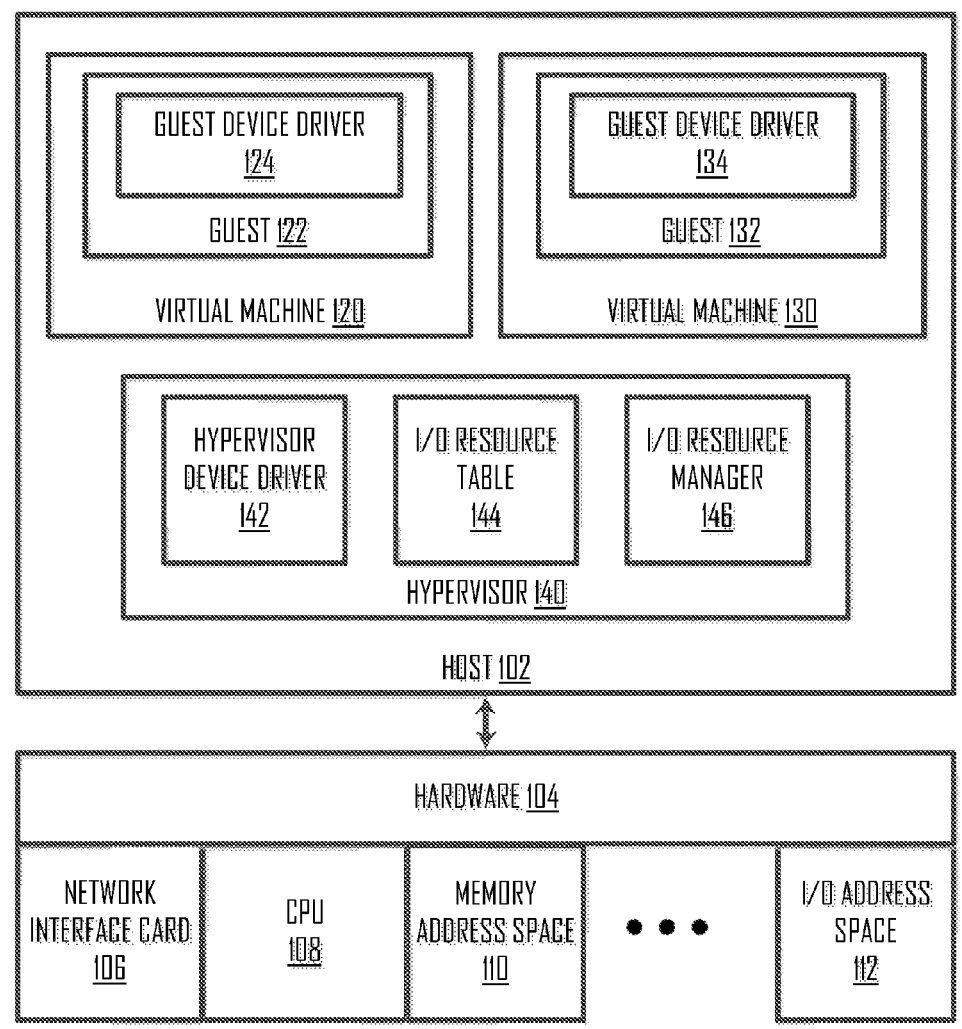
FIG. 1 is a block diagram illustrating a system for assigning one or more I/O resources to one or more virtual PCI devices, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architectures
  A. Dynamic Pool of Available I/O Resources
    1. Assign I/O Resource to a Virtual PCI Device
    2. Un-assign I/O Resource From a Virtual PCI Device
  B. Notify the Guest of Assignment
  C. Guest Access to the Virtual PCI Device
  D. Virtual Devices
III. Example Method
IV. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

To initialize a virtual device, a guest exposed to the virtual device may assign an I/O resource to the device. An I/O resource is used to pass information between a given peripheral device and a system. An I/O resource corresponds to a range of I/O space addresses, and the device uses the assigned range of I/O space addresses for the actual transmission of data to and from the device. In an example, the virtual device is a virtual PCI device that has a set of registers referred to as PCI configuration space. The PCI configuration space registers are mapped to I/O space addresses and expose memory regions through base address registers. The guest may communicate the I/O space addresses assigned to the virtual PCI device by writing the I/O base address (e.g., the I/O space address where the first register of the virtual PCI device is located) to the PCI device's base address register. The PCI device may then be made aware of the range of I/O space addresses that it occupies.

An I/O resource is a limited system resource that corresponds to a range of I/O space addresses that is constrained. The I/O resource may be, for example, an I/O port or memory. In an example, the I/O resource is an I/O port. A system typically has 65,535 I/O ports numbered from 0000h to FFFh, which may not all be usable for PCI devices. When a virtual device requests I/O ports from the guest, the guest may assign I/O ports to the requesting device. The guest, however, may assign the I/O ports in a suboptimal manner. The I/O ports are typically divided between devices in a coarse grained manner. For example, based on a PCI specification, the guest may assign a range of 4 k I/O space addresses for each device. Accordingly, for a large number of PCI devices, the system may run out of available I/O ports to assign and some PCI devices may not be assigned the resources (e.g., I/O port) necessary to be initiated and used. Further, this approach suffers from limitations such as alignment restrictions and fragmentation, which come from the need to avoid conflicts in resource assignment in guests. Additionally, a PCI device typically uses one I/O port address and not the entire assigned range of 4 k I/O space addresses assigned by the guest.

The present disclosure provides techniques to make efficient use of I/O resources and divide them in a fine grained manner. In an embodiment, the hypervisor reserves a pool of available I/O ports. The hypervisor maintains the pool of I/O ports for assignment to one or more virtual PCI devices and may assign one or more I/O ports from the pool to a virtual PCI device. The hypervisor may notify a guest of the one or more I/O ports assigned to the virtual PCI device. The hypervisor and virtual machine are executable on the host, and the virtual PCI device is exposed to the guest as part of the virtual machine.

II. Example System Architectures

FIG. 1 is a simplified block diagram illustrating a system 100 for assigning one or more I/O resources to one or more virtual PCI devices, according to an embodiment.

System 100 includes a host 102 coupled to hardware 104. Hardware 104 includes network interface card (NIC) 106, central processing unit (CPU) 108, memory address space 110, I/O address space 112, and may include other I/O devices. In a virtualized environment, access via I/O address space 112 may be quicker compared to access via memory address space 110. At the hardware level, there is no conceptual difference between memory address space 110 and I/O address space 112. Both memory address space 110 and I/O address space 112 are accessed by asserting electrical signals on the address bus and control bus (e.g., read and write signals) and by reading from and writing to the data bus (not shown).

A host machine may run one or more VMs that run applications and services. Host 102 includes a VM 120, a VM 130, and a hypervisor 140. Although two virtual machines are illustrated as running on host 102, other embodiments including fewer than or more than two virtual machines are within the scope of the present disclosure. Hypervisor 140 includes a hypervisor device driver 142 that communicates with hardware 104. The hypervisor may allow multiple operating systems, called guests, to run on the same physical system by offering virtualized hardware to the guest. The host machine may run multiple operating systems, concurrently and in isolation from other programs on a single system. The host OS or guest may include, for example, MICROSOFT® WINDOWS®, LINUX®, SOLARIS®, and MAC® OS. Trademarks are the property of their respective owners. A guest may run a different OS from another guest or from the host machine.

A VM may include a guest that executes a device driver that communicates with the hardware devices. In the embodiment illustrated in FIG. 1, a guest 122 running on VM 120 includes a guest device driver 124 that may communicate with a PCI device via one or more I/O resources in I/O address space 112, and a guest 132 running on VM 130 includes a guest device driver 134 that may communicate with a PCI device via one or more I/O resources in I/O address space 112. Hypervisor 140 may provide guest 122, 132 with access to a device to perform input/output (I/O). The device may be a physical hardware device or an emulated hardware device.

A. Dynamic Pool of Available I/O Resources

The following is a description of VM 120 and guest 122. This description may apply as well to VM 130 and guest 132. Hypervisor 140 includes an I/O resource table 144 and an I/O resource manager 146. In an embodiment, I/O resource manager 146 maintains a pool of I/O resources for assignment to one or more virtual PCI devices. I/O resource manager 146 may reserve a range of I/O space addresses for assignment to virtual PCI devices and may notify guests 122, 132 of the reserved range so that the guests avoid using them for other purposes or devices. The reserved range of I/O space addresses may be reserved at VM boot by hypervisor 140. Hypervisor 140 may divide the reserved range of I/O space addresses between virtual PCI devices in a fine grained manner, and an I/O resource may correspond to a sub-range of the reserved range of I/O space addresses. In an example, the I/O resource is an I/O port. In another example, the I/O resource is memory.

I/O resource table 144 stores information about the I/O resources assigned to PCI devices. In an example, I/O resource manager 146 inserts, deletes, and/or modifies entries in I/O resource table 144 to keep track of available I/O resources and assigned I/O resources. In such an example, I/O resource table 144 may include a first pool of available I/O resources for assignment, a second pool of I/O resources assigned to one or more virtual PCI devices (unavailable I/O resources), and one or more associations between a virtual PCI device and its assigned I/O resources. As virtual PCI devices are being added and/or removed from the system, I/O resource manager 146 may update I/O resource table 144 accordingly.

1. Assign I/O Resource to a Virtual PCI Device

Hypervisor 140 may expose a virtual PCI device (e.g., an emulated NIC) to guest 122. In an embodiment, I/O resource manager 146 dynamically assigns one or more I/O resources from the pool of available I/O resources to the virtual PCI device. A given I/O resource may be assigned when, for example, a virtual PCI device is added to the system, and the virtual PCI device makes use of I/O resources for communication between the virtual PCI device and the system. Hypervisor 140 may assign guest resources (e.g., I/O resources) to virtual PCI devices.

Hypervisor 140 may receive a request for one or more I/O resources (e.g., a range of I/O resources) from the virtual PCI device and assign, based on the request, the one or more I/O resources to the virtual PCI device. In an example, hypervisor 140 receives the request before a virtual machine to which the virtual PCI device will be exposed starts running on the host. In such an example, the virtual PCI device may be an emulated PCI device that is emulated in the hypervisor, which knows what resources (e.g., how many I/O resources) to assign to the emulated PCI device before the virtual machine starts running. In another example, hypervisor 140 receives the request while the virtual machine is running on the host. In such an example, the virtual PCI device may be a hot plug device. In another example, hypervisor 140 detects the virtual PCI device being added to the hypervisor and assigns, based on the detection, one or more I/O resources to the virtual PCI device. In such an example, an administrator may have added the virtual PCI device to hypervisor 140.

In accordance with a given I/O resource being assigned to a virtual PCI device, I/O resource manager 146 may remove the given I/O resource from the pool of available I/O resources. As such, the given I/O resource is no longer available and will not be subsequently assigned to another PCI device. I/O resource manager 146 may also add the given I/O resource to the pool of assigned I/O resources and store this association in I/O resource table 144. As such, hypervisor 140 is able to keep track of which I/O resources have been assigned and to which virtual PCI devices.

The one or more assigned I/O resources may be local to a virtual machine, and the virtual machine may have exclusive use of the assigned I/O resources. Hypervisor 140 may reserve a range of I/O resources, and an I/O resource may correspond to a sub-range of the range of I/O space addresses. Hypervisor 140 may assign a first sub-range of the range of I/O space addresses to VM 120 and may assign a second sub-range of the range of I/O space addresses to VM 130. In such an example, VM 120 has exclusive use of the first sub-range of I/O resources, and VM 130 has exclusive use of the second sub-range of I/O resources. As such, the I/O resources assigned to VM 120 are not shared with VM 130, and the I/O resources assigned to VM 130 are not shared with VM 120. Hypervisor 140 may store this association in I/O resource table 144.

Further, the I/O resources assigned to each of the virtual machines may be further divided within the virtual machine. For example, the first sub-range of the range of I/O space addresses assigned to VM 120 may be assigned to one or more virtual PCI devices executing in guest 124. Similarly, the second sub-range of the range of I/O space addresses assigned to VM 130 may be assigned to one or more virtual PCI devices executing in guest 134.

2. Un-Assign I/O Resource from a Virtual PCI Device

I/O resource manager 146 may also dynamically un-assign one or more previously assigned I/O resources from a virtual PCI device. A given I/O resource may be un-assigned when, for example, the virtual PCI device to which the given I/O resource was assigned is removed from the system. In such an example, the I/O resources assigned to the virtual PCI device are no longer needed for communication between the virtual PCI device and the system.

In an example, hypervisor 140 receives a request for one or more I/O resources (e.g., a range of I/O resources) to be un-assigned from a virtual PCI device and un-assigns, based on the request, the one or more I/O resources previously assigned to the virtual PCI device. In another example, hypervisor 140 detects the virtual PCI device being removed from the hypervisor and un-assigns, based on the detection, the one or more I/O resources previously assigned to the virtual PCI device. In such an example, an administrator may have removed the virtual PCI device from hypervisor 140.

In accordance with a given I/O resource being un-assigned from a virtual PCI device, I/O resource manager 146 may remove the given I/O resource previously assigned to the virtual PCI device from the pool of assigned I/O resources. I/O resource manager 146 may also add the given I/O resource previously assigned to the virtual PCI device to the pool of available I/O resources. As such, the given I/O resource is made available and may be subsequently assigned to another PCI device, and hypervisor 140 is able to keep track of which I/O resources are available for assignment.

The virtual PCI device may support dynamic configuration as opposed to a fixed I/O configuration. In an example, virtual PCI device may be connected to a PCI bus and have dynamic capabilities. This may be in contrast to other virtual PCI devices that are assigned fixed I/O resources that are known ahead of time. In this situation, it may be unnecessary for I/O resource manager 146 to assign I/O resources to these other virtual PCI devices.

B. Notify the Guest of Assignment

In an embodiment, I/O resource manager 146 notifies guest 122 that the one or more I/O resources has been assigned to the virtual PCI device. I/O resource manager 146 may notify the virtual PCI device about its assigned I/O resource in a paravirtualized manner. Guest 122 may then determine which I/O resources were assigned to the virtual PCI device. The virtual PCI device may be connected to the PCI bus and the notification may be separate from the devices.

In an example, the virtual PCI device includes a PCI configuration space that includes a capabilities list that enables the virtual PCI device to describe its capabilities to host 102. The capabilities list may include the resources (e.g., I/O resources) assigned by hypervisor 140. I/O resource manager 146 may notify the guest of the assignment by adding the one or more I/O resources assigned to the virtual PCI device to the capabilities list. Other techniques to notify the guest that one or more I/O resources has been assigned to the virtual PCI device exposed to the guest are also within the scope of the disclosure.

The notification to guest 122 may enable the guest to identify from the PCI configuration space the one or more I/O resources assigned to the virtual PCI device. For example, by looking into the PCI configuration space, guest 122 may determine what range of I/O space addresses is assigned to the particular virtual PCI device. Guest 122 may also know not to assign any I/O resource addresses falling within the range of assigned I/O space addresses to another device.

C. Guest Access to the Virtual PCI Device

Guest 122 may then access the virtual PCI device via hypervisor 140. For I/O resources, the hypervisor 140 performs the access on behalf of the guest. In an embodiment, hypervisor 140 receives an indication that the guest has attempted to access the virtual PCI device and traps the access request. Hypervisor 140 may search I/O resource table 144 for the I/O resource assigned to the virtual PCI device and access the assigned I/O resource in I/O address space 112 to perform the access request on behalf of the guest. The memory access may be a read access or a write access. Hypervisor 140 may use a set of functions for reading from and writing to port I/O resources.

The memory access is performed by the hypervisor, and the hypervisor may facilitate access to the I/O resources. The hypervisor may trap the access attempt by the guest to the I/O resources and perform an access, based on the trapped access attempt, to the virtual PCI device on behalf of the guest. In an example, if the guest attempts to read from the I/O resources assigned to the virtual PCI device, the hypervisor traps the read request, performs the read request on behalf of the guest, and returns to the guest the data read from the I/O resources. In another example, if the guest attempts to write to the I/O resources assigned to the virtual PCI device, the hypervisor traps the write request and performs the write request on behalf of the guest.

C. Virtual Devices

In an example, the virtual PCI device is an emulated device. An emulated device may refer to a device that is implemented by the hypervisor and is exposed to the guest as part of the VM. In an example, the emulated device may be a purely virtual device that mimics real hardware. In such an example, the emulated device may be implemented using full emulation such that the device driver to which the emulated device is assigned may work on the hardware coupled to the host machine. In another example, the emulated device may be a paravirtualized device that is controlled by a device driver that is written for a specific hypervisor. In such an example, the emulated device may be implemented using paravirtualization such that the device driver to which the emulated device is assigned does not work on the hardware coupled to the host machine. For an emulated device exposed to guest 122, hypervisor device driver 142 is a device specific driver and guest device driver 124 is a generic driver, and hypervisor 140 assigns virtual I/O resources to the emulated PCI device.

In an example, the virtual PCI device is an assigned device. The hypervisor may assign a device to a virtual machine running on a host machine. An assigned device is a physical device that is exposed to a guest as part of the VM and may also be known as a pass-through device. For an assigned device exposed to guest 122, hypervisor device driver 142 is a generic driver, guest device driver 124 is a device specific driver, and hypervisor 140 assigns physical I/O resources to the assigned PCI device.

As discussed above and further emphasized here, FIG. 1 is merely an example, which should not unduly limit the scope of the claims. For example, it should be understood that one or more components in FIG. 1 may be combined with another component. It should also be understood that one or more components in FIG. 1 may be separated into more than one component. Further, host 102 may be coupled to a network. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Additionally, system 100 includes two separate address spaces—memory address space 110 and I/O address space 112. In FIG. 1, the I/O devices have a separate address space (e.g., I/O address space 112) from the system's memory space (e.g., memory address space 110), which is accomplished by an extra pin on the CPU's physical interface. This technique of performing I/O between the given device and the system may be referred to as port-mapped I/O. Port-mapped I/O uses a special set of CPU instructions specifically for performing I/O. In an example, port-mapped I/O may be found on x86 architecture, specifically the IN and OUT instructions that can read and write one to four bytes to an I/O device. Although a port-mapped I/O architecture is illustrated in FIG. 1, this is not intended to be limiting and another embodiment that implements a memory-mapped I/O architecture is within the scope of the disclosure.

Figure 2:
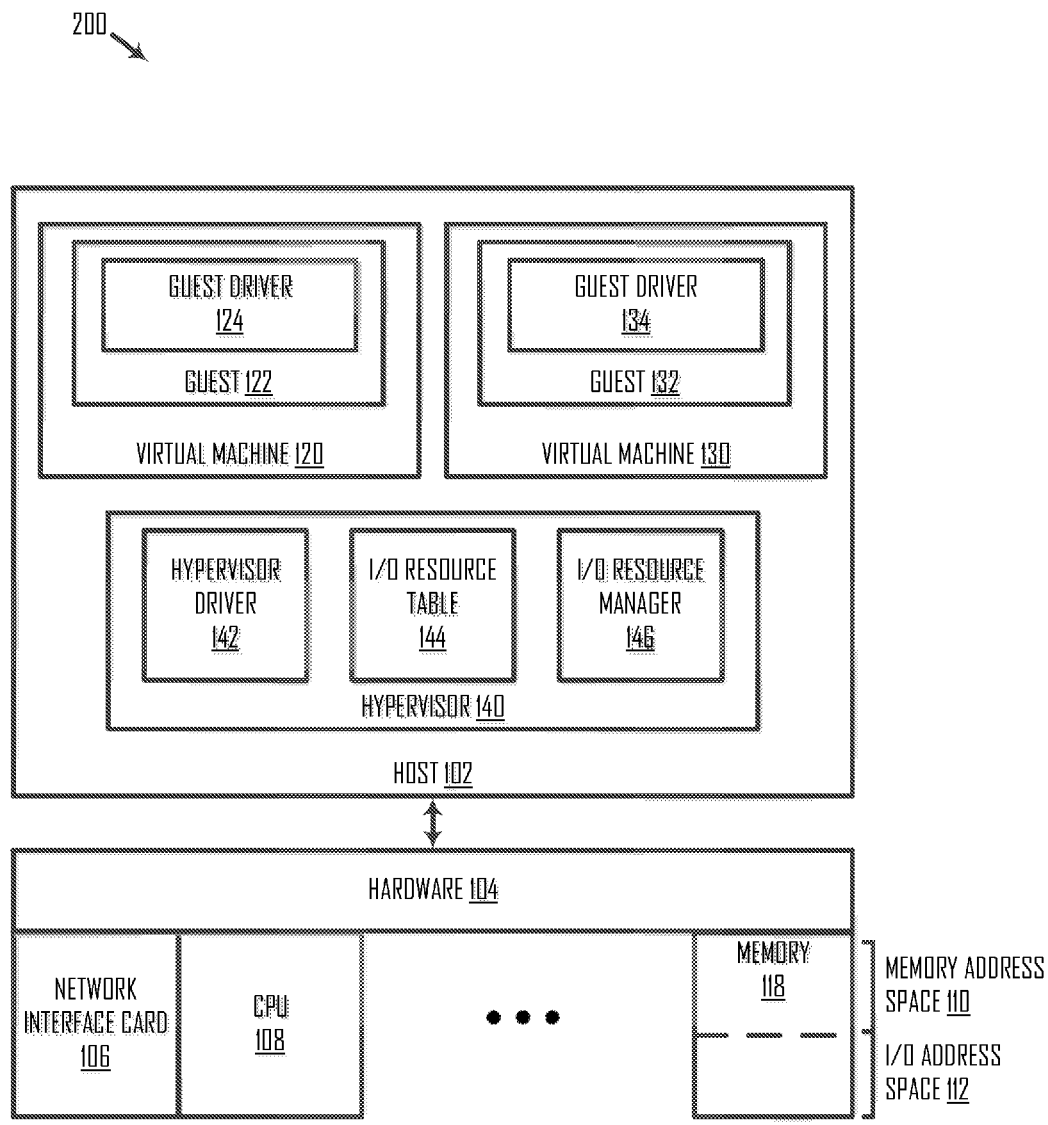
FIG. 2 is another block diagram illustrating a system for assigning one or more I/O resources to one or more virtual PCI devices, according to an embodiment.

FIG. 2 is a block diagram illustrating a system 200 for assigning one or more I/O resources to one or more virtual PCI devices, according to an embodiment. System 200 implements a memory-mapped I/O architecture. In FIG. 2, memory 118 includes memory address space 110 and I/O address space 112.

III. Example Method

Figure 3:
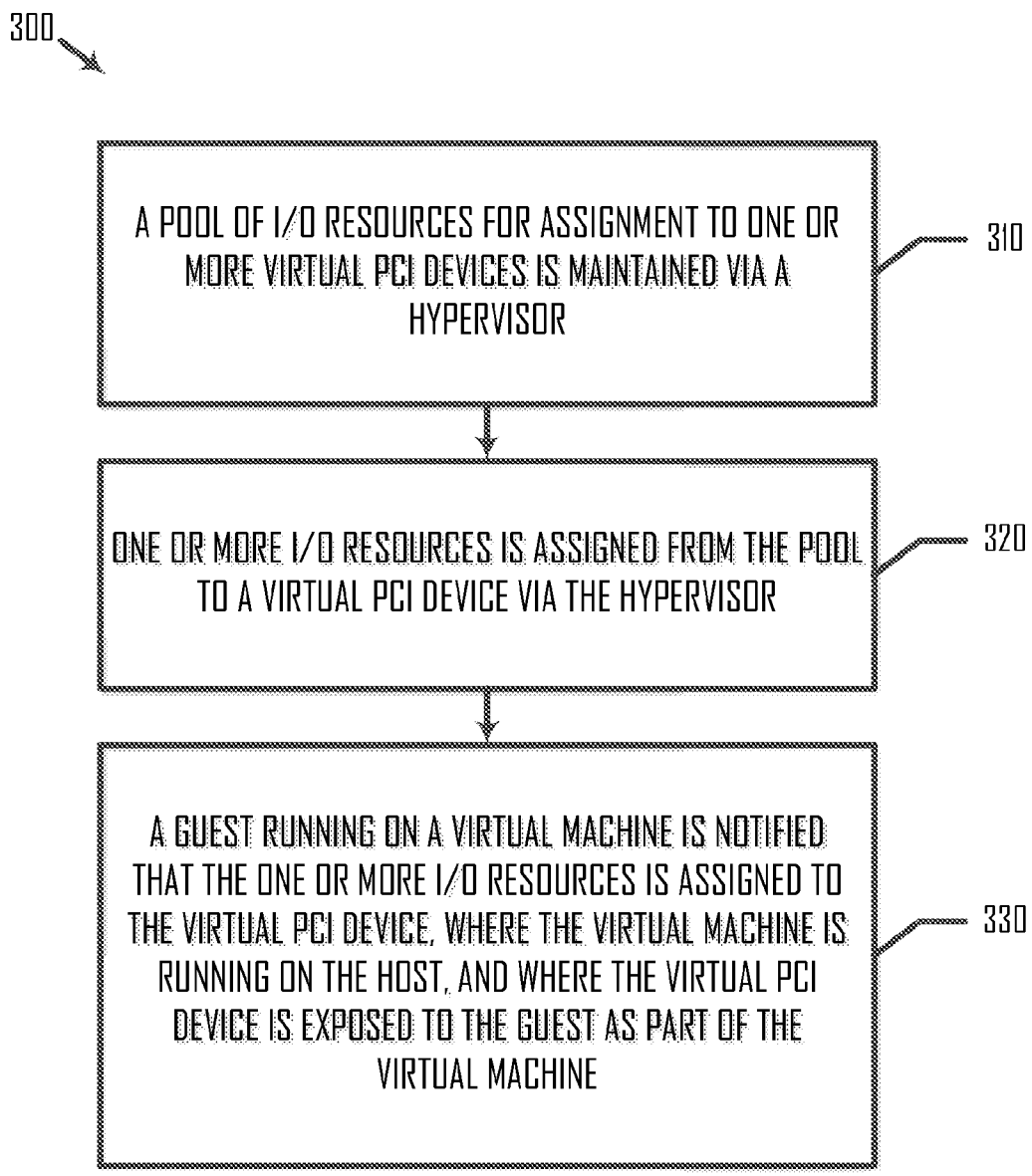
FIG. 3 is a flowchart illustrating a method of assigning one or more I/O resources to one or more virtual PCI devices, according to an embodiment.

FIG. 3 is a simplified flowchart illustrating a method 300 of assigning one or more I/O resources to one or more virtual PCI devices, according to an embodiment. Method 300 is not meant to be limiting and may be used in other applications.

Method 300 includes blocks 310-330. In a block 310, a pool of I/O resources for assignment to one or more virtual PCI devices is maintained via a hypervisor executable on a host. In an example, hypervisor 140 maintains a pool of I/O resources for assignment to one or more virtual PCI devices. In a block 320, one or more I/O resources is assigned from the pool to a virtual PCI device via the hypervisor. In an example, hypervisor 140 assigns one or more I/O resources from the pool to a virtual PCI device. In a block 330, a guest running on a virtual machine is notified that the one or more I/O resources is assigned to the virtual PCI device, where the virtual machine is executable on the host, and where the virtual PCI device is exposed to the guest as part of the virtual machine. In an example, hypervisor 140 notifies a guest running on a virtual machine that the one or more I/O resources is assigned to the virtual PCI device, where the virtual machine is executable on the host, and where the virtual PCI device is exposed to the guest as part of the virtual machine.

It is also understood that additional processes may be performed before, during, or after blocks 310-330 discussed above. It is also understood that one or more of the blocks of method 300 described herein may be omitted, combined, or performed in a different sequence as desired.

IV. Example Computing System

Figure 4:
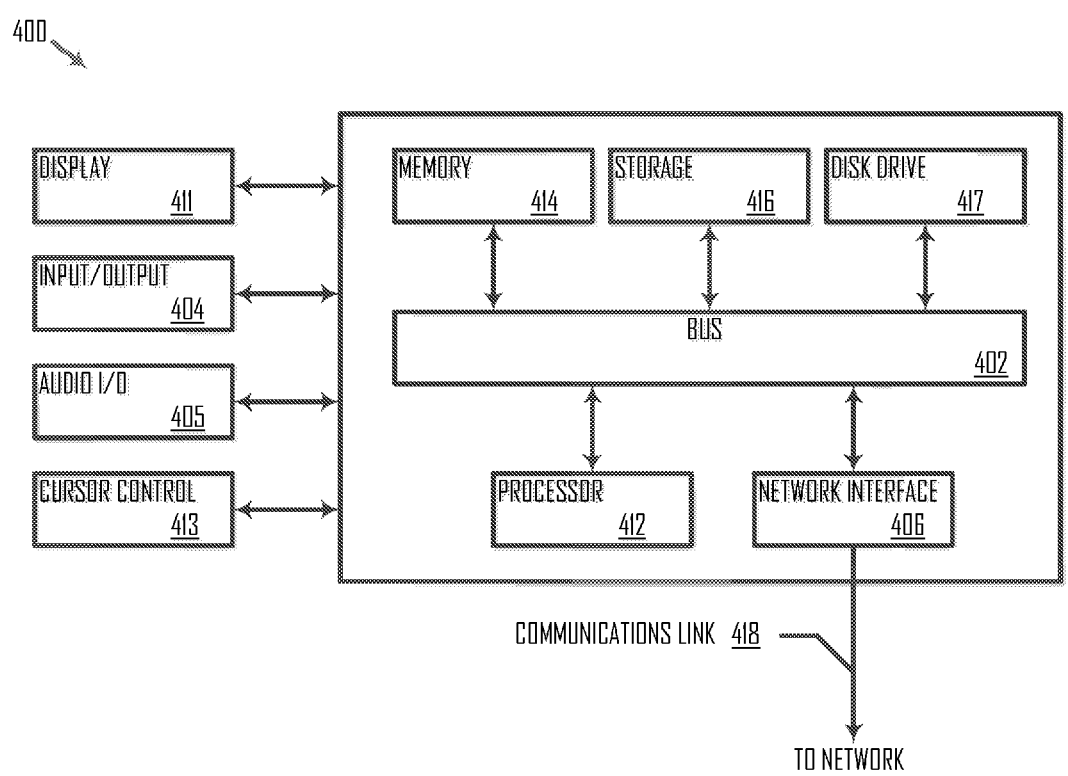
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, host 102 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown).

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a microcontroller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of assigning one or more I/O resources to one or more virtual PCI devices, the method comprising:
    maintaining, via a hypervisor executable on a host, a pool of I/O resources for assignment to one or more virtual PCI devices;
    receiving, from a virtual PCI device of the one or more virtual PCI devices, a request for one or more I/O resources of the pool of I/O resources;
    in response to the request, assigning, via the hypervisor, the one or more I/O resources from the pool to the virtual PCI device; and
    notifying, via the hypervisor, a guest running on a virtual machine that the one or more I/O resources from the pool is assigned to the virtual PCI device, wherein the virtual machine is executable on the host, and wherein the virtual PCI device is exposed to the guest as part of the virtual machine.

2. The method of claim 1, wherein an I/O resource of the one or more I/O resources is an I/O port.

3. The method of claim 1, wherein an I/O resource of the one or more I/O resources is a memory address space.

4. The method of claim 1, further including:
    detecting the virtual PCI device being added to the hypervisor, wherein the assigning includes assigning, based on the detecting, the one or more I/O resources to the virtual PCI device.

5. The method of claim 1, wherein the receiving occurs before the virtual machine is running on the host.

6. The method of claim 1, wherein the receiving occurs while the virtual machine is running on the host.

7. The method of claim 1, wherein the maintaining includes maintaining a table including a first pool of available I/O resources for assignment, a second pool of I/O resources assigned to one or more virtual PCI devices, and one or more associations between an I/O resource of the one or more I/O resources and a virtual PCI device of the one or more virtual PCI devices to which an I/O resource is assigned, the method further including:

removing the one or more I/O resources assigned to the virtual PCI device from the first pool of available I/O resources;

adding the one or more I/O resources assigned to the virtual PCI device to the second pool of assigned I/O resources; and storing an association between the virtual PCI device and the one or more I/O resources assigned to the virtual PCI device.

8. The method of claim 7, further including:

detecting that the virtual PCI device has been removed from the hypervisor; and adding, based on the detecting, the one or more I/O resources assigned to the virtual PCI device to the first pool of available I/O resources; and removing, based on the detecting, the one or more I/O resources assigned to the virtual PCI device from the second pool of assigned I/O resources.

9. The method of claim 7, further including:

receiving a second request for a set of I/O resources assigned to the virtual PCI device to be un-assigned from the virtual PCI device;

removing the set of I/O resources from the second pool, wherein the removing the set of I/O resources is in response to the second request;

adding the set of I/O resources to the first pool, wherein the adding the set of I/O resources is in response to the second request; and removing the association between the virtual PCI device and the set of I/O resources.

10. The method of claim 1, wherein the virtual PCI device includes a PCI configuration space, and the notifying a guest causes the guest to identify from the PCI configuration space the one or more I/O resources assigned to the virtual PCI device.

11. The method of claim 10, wherein the PCI configuration space includes a capabilities list, and the notifying a guest includes adding the one or more I/O resources assigned to the virtual PCI device to the capabilities list.

12. A system for assigning one or more I/O resources to one or more virtual PCI devices, the system comprising:

an I/O resource table that includes a pool of one or more available I/O resources for assignment to one or more virtual PCI devices; and a hypervisor that maintains the pool of I/O resources, receives from a virtual PCI device of the one or more virtual PCI devices a request for one or more I/O resources of the pool of I/O resources, assigns the one or more I/O resources from the pool to the virtual PCI device in response to the request, and notifies a guest running on a virtual machine that the one or more I/O resources is assigned to the virtual PCI device, wherein the hypervisor and virtual machine are executable on a host, and the virtual PCI device is exposed to the guest.

13. The system of claim 12, wherein the virtual PCI device is connected to a PCI bus and has dynamic capabilities.

14. The system of claim 12, wherein the virtual PCI device is a hot plug device.

15. The system of claim 12, wherein the I/O resource is an I/O port.

16. The system of claim 12, wherein the I/O resource is memory.

17. The system of claim 12, wherein the hypervisor receives an indication that the guest has attempted to access the virtual PCI device, traps the access request, and performs the access request on behalf of the guest.

18. The system of claim 17, wherein the virtual PCI device is one of an emulated device and an assigned device.

19. The system of claim 12, wherein the hypervisor reserves the one or more available I/O resources for assignment to one or more virtual PCI devices and sends the guest a notification that the one or more available I/O resources has been reserved for assignment to one or more virtual PCI devices.

20. A non-transitory machine-readable medium comprising a plurality of machine-readable instructions that when executed by one or more processors is adapted to cause the one or more processors to perform a method comprising:

maintaining, via a hypervisor executable on a host, a pool of I/O resources for assignment to one or more virtual PCI devices;

receiving, from a virtual PCI device of the one or more virtual PCI devices, a request for one or more I/O resources of the pool of I/O resources;

in response to the request, assigning, via the hypervisor, the one or more I/O resources from the pool to the virtual PCI device; and notifying, via the hypervisor, a guest running on a virtual machine that the one or more I/O resources from the pool is assigned to the virtual PCI device, wherein the virtual machine is executable on the host, and wherein the virtual PCI device is exposed to the guest as part of the virtual machine.

* * * * *